(12) United States Patent
Ito et al.

(10) Patent No.: US 9,473,693 B2
(45) Date of Patent: Oct. 18, 2016

(54) PHOTOGRAPHIC APPARATUS, CAMERA SYSTEM AND METHODS FOR CALCULATING FOCUS CONTROL INFORMATION BASED ON A DISTANCE BETWEEN CENTERS OF GRAVITY DISTRIBUTIONS OF LIGHT RECEIVING SENSITIVITIES

(71) Applicant: Olympus Corporation, Hachioji-shi, Tokyo (JP)

(72) Inventors: Kazumi Ito, Fuchu (JP); Keigo Matsuo, Kunitachi (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/727,052

(22) Filed: Jun. 1, 2015

(65) Prior Publication Data
US 2015/0264251 A1    Sep. 17, 2015

Related U.S. Application Data

(63) Continuation of application No. PCT/JP2013/080781, filed on Nov. 14, 2013.

(30) Foreign Application Priority Data

Dec. 20, 2012 (JP) .................. 2012-278715

(51) Int. Cl.
| | | |
|---|---|---|
| H04N 5/232 | (2006.01) | |
| G02B 7/34 | (2006.01) | |
| G03B 13/36 | (2006.01) | |
| H04N 5/369 | (2011.01) | |
| H04N 5/225 | (2006.01) | |

(52) U.S. Cl.
CPC ........... H04N 5/23212 (2013.01); G02B 7/34 (2013.01); G03B 13/36 (2013.01); H04N 5/2254 (2013.01); H04N 5/232 (2013.01); H04N 5/3696 (2013.01)

(58) Field of Classification Search
CPC ........... H04N 5/23212; H04N 5/2254; H04N 5/232; H04N 5/3696; G02B 7/34; G02B 13/36
See application file for complete search history.

(56) References Cited

U.S. PATENT DOCUMENTS

| 5,422,701 A | 6/1995 | Utagawa |
|---|---|---|
| 7,863,550 B2 | 1/2011 | Kusaka |

(Continued)

FOREIGN PATENT DOCUMENTS

| EP | 0 465 671 | 1/1992 |
|---|---|---|
| JP | 04-211212 | 8/1992 |

(Continued)

OTHER PUBLICATIONS

International Search Report to PCT/JP2013/080781.

(Continued)

*Primary Examiner* — Nicholas Giles
(74) *Attorney, Agent, or Firm* — John C. Pokotylo; Straub & Pokotylo

(57) ABSTRACT

A photographing apparatus has a body portion to which a lens portion is mountable and to which an image forming luminous flux is conducted from the lens portion, and the photographing apparatus includes an image pickup device having pixels for image pickup and pixels for focus detection, a storage section that retains information of sensitivity characteristics of the pixels for focus detection, and a control amount calculation section that obtains information about an incident angle and an angular range of the image forming luminous flux from the lens portion and calculates information for focus control based on the obtained information and information read from the storage section. The focus control of high precision is enabled with simple configuration, irrespective of a lens system.

30 Claims, 10 Drawing Sheets

(56) References Cited

U.S. PATENT DOCUMENTS

| | | | | |
|---|---|---|---|---|
| 8,614,755 | B2* | 12/2013 | Takamiya | ......... H04N 5/23212 348/277 |
| 2010/0157094 | A1 | 6/2010 | Takamiya | |
| 2011/0199506 | A1* | 8/2011 | Takamiya | ............... G02B 7/34 348/222.1 |
| 2011/0273602 | A1* | 11/2011 | Takamiya | ......... H04N 5/23212 348/302 |
| 2012/0262604 | A1 | 10/2012 | Ishii | |

FOREIGN PATENT DOCUMENTS

| | | |
|---|---|---|
| JP | 07-199052 | 8/1995 |
| JP | 2007-189312 | 7/2007 |
| JP | 2009-122524 | 6/2009 |
| JP | 2009-290157 | 12/2009 |
| JP | 2010-107771 | 5/2010 |
| JP | 2013-536115 | 9/2013 |
| WO | WO 91/11742 | 8/1991 |

OTHER PUBLICATIONS

Office Action to corresponding Japanese Patent Application Serial No. 2012-278715 mailed May 20, 2014 (4 pgs.), with translation (6 pgs.).

Decision to Grant of Japanese Patent Application No. 2012-278715, mailed on Sep. 24, 2014 (3 pgs.) with translation (3 pgs.).

Supplementary European Search Report to corresponding European Application No. EP 13 86 6237, mailed on Sep. 8, 2016.

* cited by examiner (a)

| | X | CF-NUMBER | 1/CEXPI |
|---|---|---|---|
| LENS STATE 1 | 0 | ... | ... |
| | 0.5 | ... | ... |
| | 1 | ... | ... |
| LENS STATE 2 | X | CF-NUMBER | 1/CEXPI |
| | 0 | ... | ... |
| | 0.5 | ... | ... |
| | 1 | ... | ... |
| ⋮ | ⋮ | ⋮ | ⋮ |

| 1000/CEXPI<br>CF-NUMBER | −15 | ⋯ | +3 |
|---|---|---|---|
| 1 | α1−15 | ⋯ | α1+3 |
| ⋮ | ⋮ | ⋯ | ⋮ |
| 22 | α22−15 | ⋯ | α22+3 |

US 9,473,693 B2

PHOTOGRAPHIC APPARATUS, CAMERA SYSTEM AND METHODS FOR CALCULATING FOCUS CONTROL INFORMATION BASED ON A DISTANCE BETWEEN CENTERS OF GRAVITY DISTRIBUTIONS OF LIGHT RECEIVING SENSITIVITIES

CROSS REFERENCE TO RELATED APPLICATION

This application is a continuation application of PCT/JP2013/080781 filed on Nov. 14, 2013 and claims benefit of Japanese Application No. 2012-278715 filed in Japan on Dec. 20, 2012, the entire contents of which are incorporated herein by this reference.

BACKGROUND OF INVENTION

1. Field of the Invention

The present invention relates to a photographing apparatus having an autofocus function, a method of calculating information for focus control, and a camera system.

2. Description of the Related Art

In recent years, many of portable apparatuses (photographing apparatuses) with photographing functions have autofocus functions. In the photographing apparatuses of this type, there is an apparatus in which an image pickup device having pixels for focus detection (hereinafter referred to as "AF pixels") incorporated therein in addition to pixels for image pickup (normal pixels) to form an image is adopted and autofocusing is performed by a pupil division phase difference method. In this method, it is necessary to divide a pupil in right and left directions and to form AF pixels having image pickup portions that receive luminous fluxes passed through the right and left pupils separately, in the image pickup device. High-speed autofocusing is possible by generating an AF signal for focusing by an arithmetic operation on image signals by the AF pixels of these types (hereinafter referred to as "AF operation" or "correlation operation"), and performing the focusing.

In the AF operation in which a displacement amount of the focusing (a defocus amount) is obtained in accordance with a state of use of a lens, an arithmetic operation using an interval between a plurality of images by different luminous fluxes on a light receiving surface (two-image interval) and various parameters for the AF operation (hereinafter referred to as "AF operation parameters") is performed.

SUMMARY OF THE INVENTION

A photographing apparatus according to the present invention has a body portion to which a lens portion is mountable and to which an image forming luminous flux is conducted from the lens portion, the photographing apparatus comprising: an image pickup device having pixels for image pickup and at least two types of pixels for focus detection for use in a pupil dividing phase difference method; a storage section that retains information of sensitivity characteristics indicative of light receiving sensitivity corresponding to ray incident angles on the two types of pixels for focus detection at a predetermined image height; and a control amount calculation section that obtains information about incident angular ranges of the image forming luminous fluxes respectively incident on the two types of pixels for focus detection, from the lens portion, reads the information stored in the storage section, obtains centers of gravity of distributions of the light receiving sensitivity when the angular ranges based on the information about the angular ranges of the image forming luminous fluxes are set as the ray incident angles on the two types of pixels for focus detection, and acquires information for focus control by a distance between the obtained centers of gravity.

Further, a photographing apparatus according to the present invention has a lens portion for conducting a photographing luminous flux and a body portion to which the lens portion is mountable, the photographing apparatus comprising: an image pickup device having pixels for image pickup and at least two types of pixels for focus detection for use in a pupil dividing phase difference method, the image forming luminous flux from the lens portion being incident on the image pickup device; a first storage section that retains information about incident angular ranges of image forming luminous fluxes that are incident on the two types of pixels for focus detection; a second storage section that stores information for focus control, which is obtained based on information of sensitivity characteristics indicative of light receiving sensitivity corresponding to ray incident angles on the two types of pixels for focus detection at a predetermined image height and information about the incident angular ranges, to be associated with the information about the incident angular ranges; and a control amount output section that reads the information for focus control from the second storage section based on the information read from the first storage section and outputs focus control information, wherein a distance between centers of gravity of distributions of the light receiving sensitivity is stored in the second storage section as the information for focus control when the angular ranges based on the information about the angular ranges of the image forming luminous fluxes are set as the ray incident angles on the two types of pixels for focus detection.

Furthermore, a method of calculating information for focus control according to the present invention is a method of calculating the information for focus control in a photographing apparatus that includes a body portion and a lens portion mountable on the body portion, the body portion having an image pickup device including a plurality of pairs of pixels for focus detection that respectively receive a pair of luminous fluxes obtained by subjecting a photographing luminous flux to pupil division, the method comprising: reading information about incident angular ranges of the image forming luminous fluxes respectively incident on the pair of pixels for focus detection, from the lens portion; reading information of sensitivity characteristics indicative of light receiving sensitivity corresponding to ray incident angles on the pair of pixels for focus detection at a predetermined image height, from the body portion; and calculating an interval of centers of gravity of luminous fluxes respectively incident on the pair of pixels for focus detection based on the information about the incident angular ranges and the information of the sensitivity characteristics, and calculates the information for focus control.

Moreover, a camera system according to the present invention has a lens portion for conducting a photographing luminous flux and a body portion to which the lens portion is mountable, the camera system comprising: an image pickup device having pixels for image pickup and at least two types of pixels for focus detection for use in a pupil dividing phase difference method; a first storage section that is provided at the lens portion and retains information about incident angular ranges of the image forming luminous fluxes that are incident on the two types of pixels for focus detection; a second storage section that is provided at the body portion and retains information of sensitivity characteristics indicative of light receiving sensitivity corresponding to ray incident angles on the two types of pixels for focus detection at a predetermined image height; and a control amount calculation section that obtains, based on information read from the first and second storage sections, centers of gravity of distributions of the light receiving sensitivity when the angular ranges based on the information about the angular ranges of the image forming luminous fluxes are set as the ray incident angles on the two types of pixels for focus detection, and acquires information for focus control by a distance between the obtained centers of gravity.

BRIEF DESCRIPTION OF THE DRAWINGS

FIG. 9 is an explanatory diagram for explaining information retained in a memory 12;

DETAILED DESCRIPTION OF THE PREFERRED EMBODIMENT(S)

Figure 1:
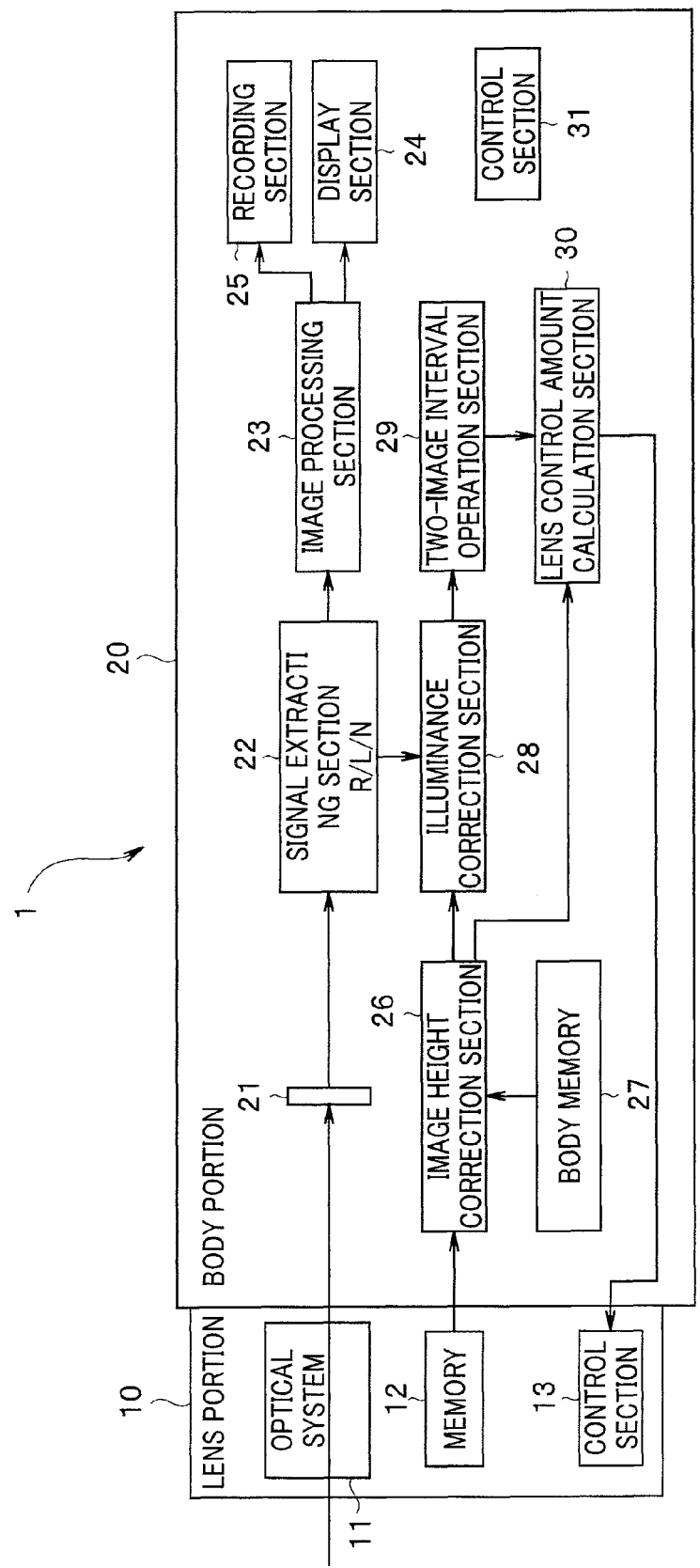
FIG. 1 is a block diagram showing a photographing apparatus according to a first embodiment of the present invention.

Hereinafter, embodiments of the present invention will be described in detail referring to the drawings.

First Embodiment

FIG. 1 is a block diagram showing a photographing apparatus according to the first embodiment of the present invention.

First, autofocus (AF) processing adopted in the present embodiment will be described referring to FIGS. 2 through 8.

Figure 2:
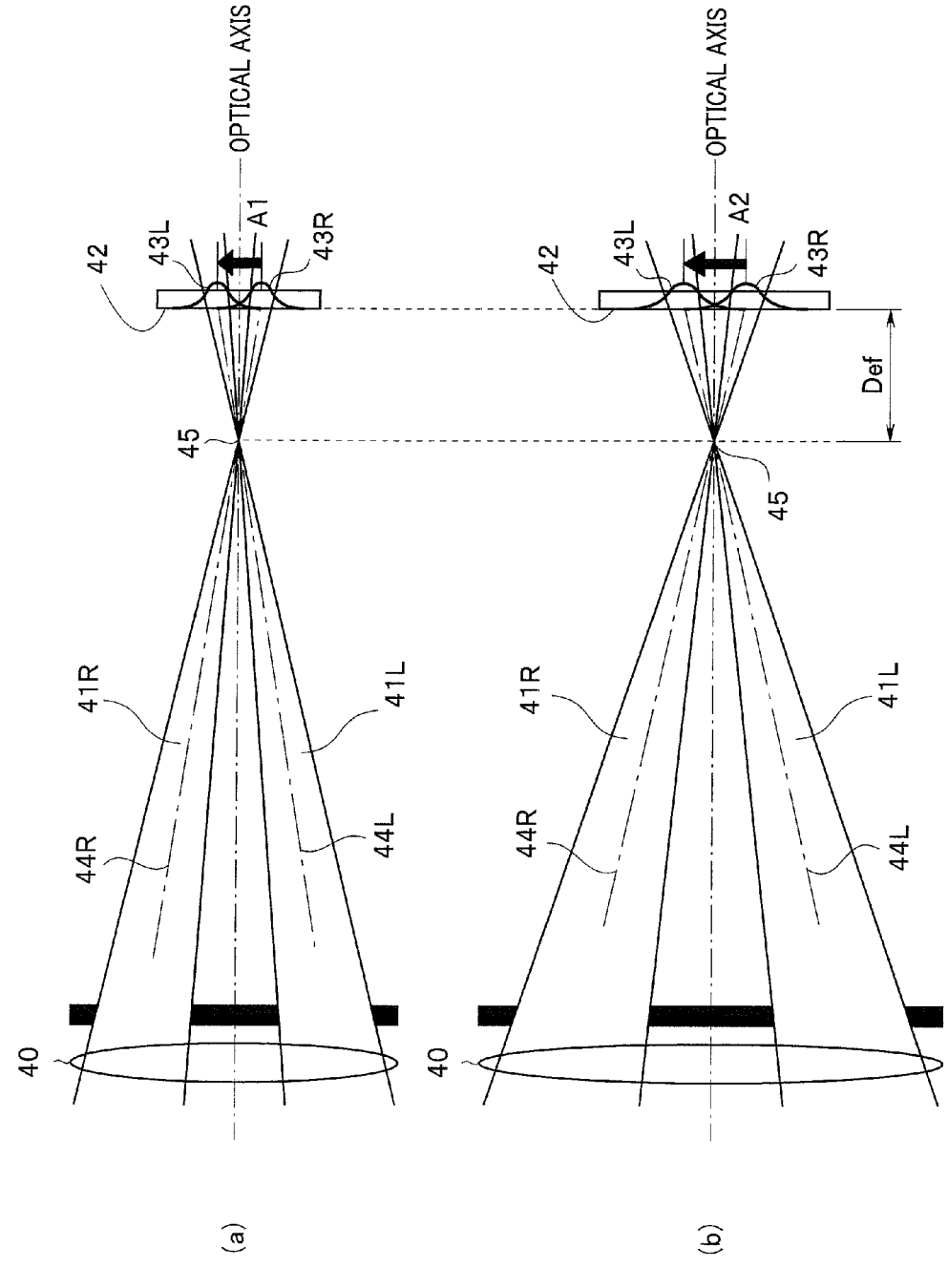
FIG. 2 is an explanatory diagram for explaining relation between an F-number and a two-image interval in a pupil division phase difference method.

FIG. 2 is an explanatory diagram for explaining relation between an F-number and a two-image interval in a pupil division phase difference method. FIG. 2($a$) shows an example in a case of a large F-number, and FIG. 2($b$) shows an example in a case of a small F-number. FIG. 2 shows a state in which a right luminous flux 41R and a left luminous flux 41L are incident on an image pickup surface 42 according to the pupil division phase difference method. In FIG. 2, a diaphragm is depicted in the vicinity of a lens on an optical axis for the sake of explanation of a principle, but actually, means for dividing a luminal flux is provided in an image pickup device.

In the pupil division phase difference method, an optical path from an object is divided into a right direction and a left direction, for example, at an exit pupil and a luminous flux in the right direction (right luminous flux) and a luminous flux in the left direction (left luminous flux) are made incident on the image pickup surface (light receiving surface) of the image pickup device. Pixels for receiving the right luminous flux (hereinafter referred to as "R pixels") and pixels for receiving the left luminous flux (hereinafter referred to as "L pixels") are formed at the image pickup device, and the right luminous flux and the left luminous flux are allowed to form images separately on respective image pickup surfaces of the R pixels and the L pixels.

In FIG. 2, right images 43R by the right luminous flux 41R are obtained by the R pixels, and left images 43L by the left luminous flux 41L are obtained by the L pixels, the luminous fluxes being incident through a lens 40. A displacement amount and a displacement direction of these right images 43R and left images 43L on the image pickup surface 42 correspond to a defocus amount and a defocus direction, respectively. A distance between a principal ray 44R of the right luminous flux 41R and a principal ray 44L of the right luminous flux 41L on the image pickup surface 42 is a two-image interval A1 (the filled arrow) and the two-image interval A1 is proportional to a distance between the image pickup surface 42 and a focal point 45 (the defocus amount). A proportionality coefficient is AF sensitivity and when the AF sensitivity in FIG. 2($a$) is assumed to be α1, a defocus amount Def can be expressed by Def=α1×A1.

Since the two-image interval can be obtained from outputs of the R pixels and the L pixels, the defocus amount can be calculated by obtaining the AF sensitivity. The AF sensitivity can be obtained from AF operation parameters based on characteristics of the lens and the image pickup device.

FIG. 2($b$) shows an example in which an effective aperture of the lens 40 differs from that in an example of FIG. 2($a$). These examples are shown such that the defocus amount Def in FIG. 2($b$) coincides with the defocus amount Def in FIG. 2($a$). Assuming the two-image interval to be A2 and the AF sensitivity obtained by the AF operation parameters to be α2 in FIG. 2($b$), the defocus amount Def can be expressed by Def=α2×A2.

The examples of FIGS. 2($a$) and 2($b$) show that the two-image interval changes in accordance with FNo even when the defocus amount Def is unchanged. That is, the examples of FIG. 2 show that the AF sensitivity changes in accordance with FNo and information of the effective aperture, for example the F-number can be used as the AF operation parameter for obtaining the AF sensitivity. That is, in the examples of FIG. 2, the defocus amount can be calculated from the information of the two-image interval and the F-number.

However, the F-number is defined by a ray on the optical axis. Therefore, in the present embodiment, information of an corrected F-number (CF-number) obtained by correcting the F-number in accordance with an image height is used as the AF operation parameter.

Figure 3:
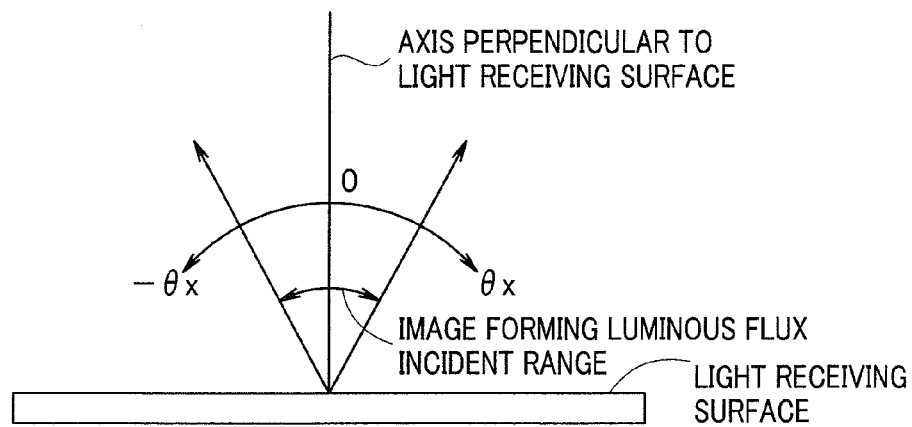
FIG. 3 is an explanatory diagram for explaining sensitivity characteristics of AF pixels.
Figure 3:
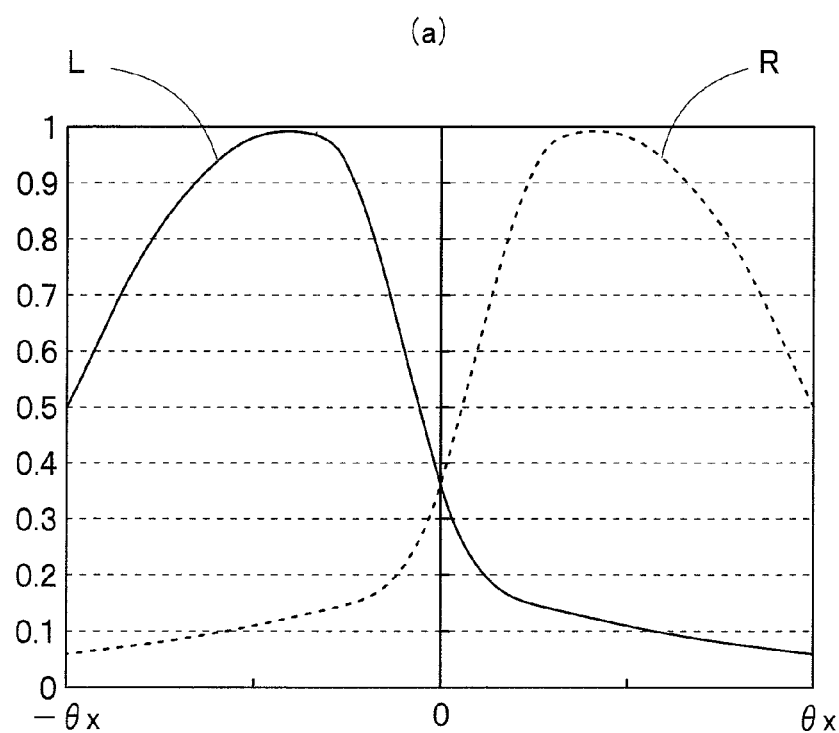

FIG. 3 is an explanatory diagram for explaining sensitivity characteristics of the AF pixels. FIG. 3(a) shows a range of an incident angle (ray incident angle θx) of a luminous flux (an image forming luminous flux) incident on the light receiving surface, in a pupil dividing direction.

As shown in FIG. 3(a), the ray incident angle θx is indicated as an angle, in positive and negative directions, between a ray incident angle and an axis perpendicular to the light receiving surface, with the axis perpendicular to the light receiving surface indicating an angle of zero degree.

FIG. 3(b) shows characteristics of light receiving sensitivity of the L pixels that receive the left luminous flux which passes through a left pupil by the solid line L, and the R pixels that receive the right luminous flux which passes through a right pupil by the broken line R, with the horizontal axis indicating the ray incident angle θ and the vertical axis indicating the sensitivity.

Figure 4:
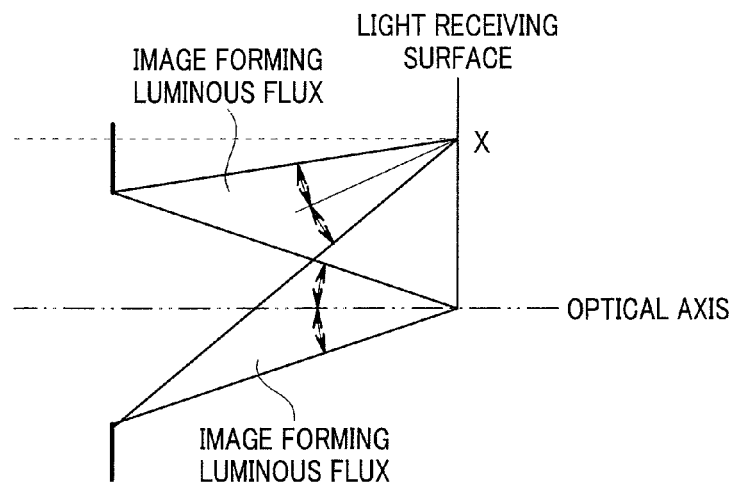
FIG. 4 is an explanatory diagram for explaining a state of incident angles of image forming luminous fluxes on the AF pixels outside an optical axis.

As shown in FIG. 4, there is a case where an off-axis luminous flux has inclination with respect to the optical axis.

Thus, in the AF operation using off-axis AF pixels, an appropriate AF sensitivity cannot be obtained by merely using the corrected F-number indicative of a width of the luminous flux, and a value indicative of an inclination of the luminous flux is necessary.

The light receiving sensitivity of the AF pixels has an angular characteristic in the pupil dividing direction and therefore in the present embodiment, the AF operation parameters are set taking account of an angular range of the image forming luminous flux and the angular characteristic. That is, in the present embodiment, not only the corrected F-number in accordance with the image height but also information of the sensitivity of the L and R pixels and information about the angular range of the image forming luminous flux incident on the L and R pixels are used.

Figure 5:
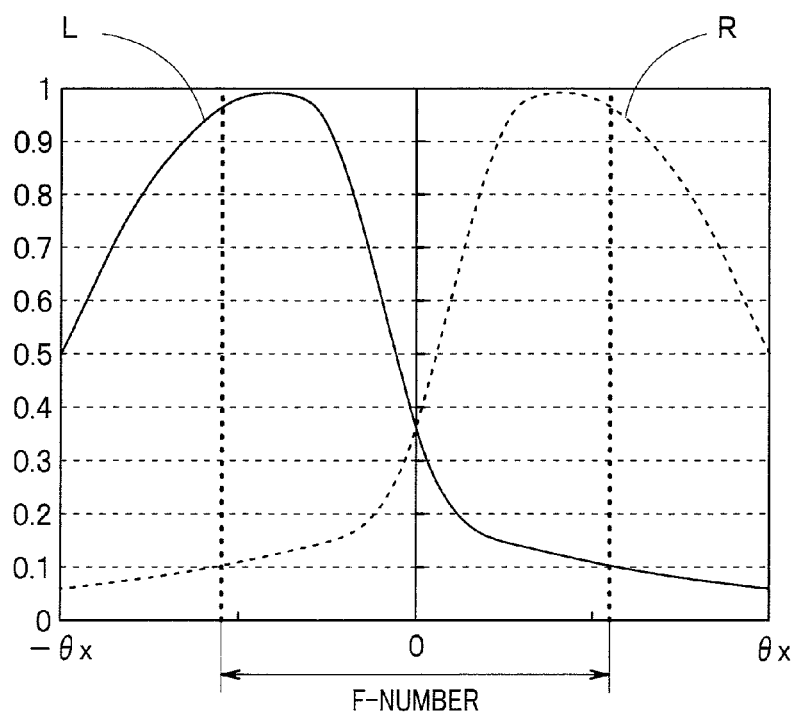
FIG. 5 is an explanatory diagram for explaining relation between an angular range of an image forming luminous flux and AF sensitivity with respect to the AF pixels on the optical axis.
Figure 6:
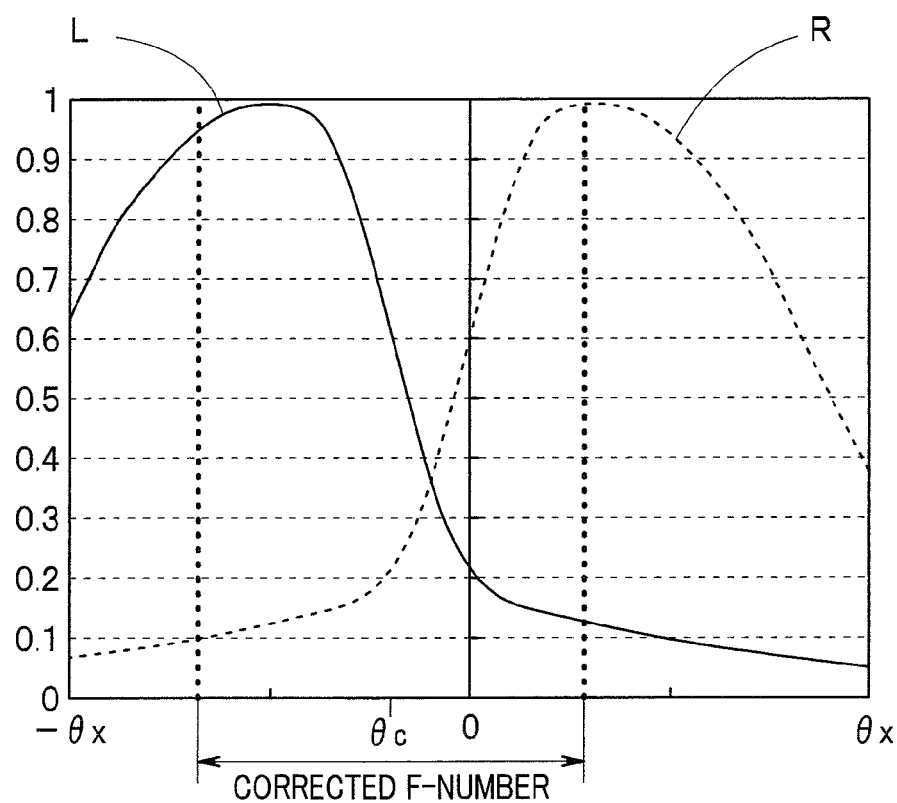
FIG. 6 is an explanatory diagram for explaining relation between an angular range of an image forming luminous flux and AF sensitivity with respect to the AF pixels outside of the optical axis.

FIGS. 5 and 6 are explanatory diagrams for explaining relation between the angular range of the image forming luminous flux and the AF sensitivity. FIG. 5 shows the relation with respect to the AF pixels on the optical axis and FIG. 6 shows the relation with respect to the AF pixels outside the optical axis. As shown in FIG. 5, the image forming luminous flux in an angular range indicated by the thick broken lines is incident on the AF pixels on the optical axis. The image forming luminous flux is symmetrical with respect to the optical axis as shown in FIG. 4, and an angular difference between the maximum incident angle and the minimum incident angle corresponds to the F-number.

Further, the maximum incident angle and the minimum incident angle of the image forming luminous flux in the AF pixels outside the optical axis shift in accordance with the image height as shown in FIG. 4, and define, for example, an angular range indicated by the thick broken lines in FIG. 6. It is noted that in this case an angular difference of the maximum incident angle and the minimum incident angle of the image forming luminous flux, indication of which is omitted in FIG. 4, corresponds to the corrected F-number as being corrected in accordance with the image height, to be exact. Therefore, the information of the maximum incident angle and the minimum incident angle of the image forming luminous flux can be obtained by using the corrected F-number and an incident angle of a ray passing a center of the image forming luminous flux (hereinafter referred to as "image forming luminous flux incident angle").

In the present embodiment, in order to simplify the arithmetic operations, it is configured such that a range of the luminous flux incident on the AF pixel is obtained using the information of the corrected F-number and the image forming luminous flux incident angle (a central direction of the image forming luminous flux), and thereby the AF sensitivity is obtained.

In this case, an incident angle of the image forming luminous flux incident on the light receiving surface at a predetermined height is influenced by aberration of an optical system between a diaphragm and the light receiving surface, etc. and therefore is different for each optical system. Thus, in the present embodiment, the information of the image forming luminous flux incident angle in accordance with the image height on the light receiving surface is used as the AF operation parameter.

Figure 7:
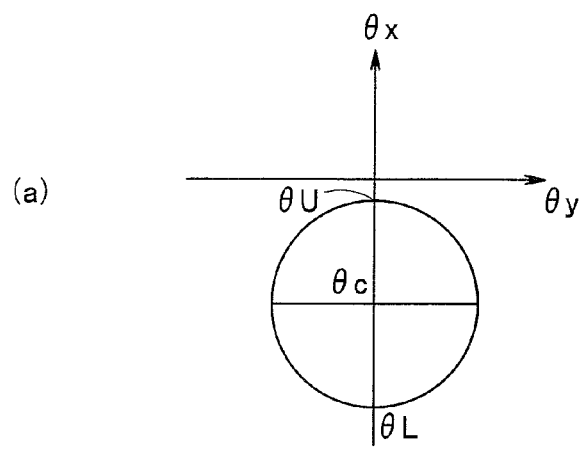
FIG. 7 is an explanatory diagram for explaining an effective aperture (corrected F-number) and an image forming luminous flux incident angle θc which indicates a central direction of the image forming luminous flux with respect to an incident luminous flux incident on the AF pixels at an image height X.
Figure 7:
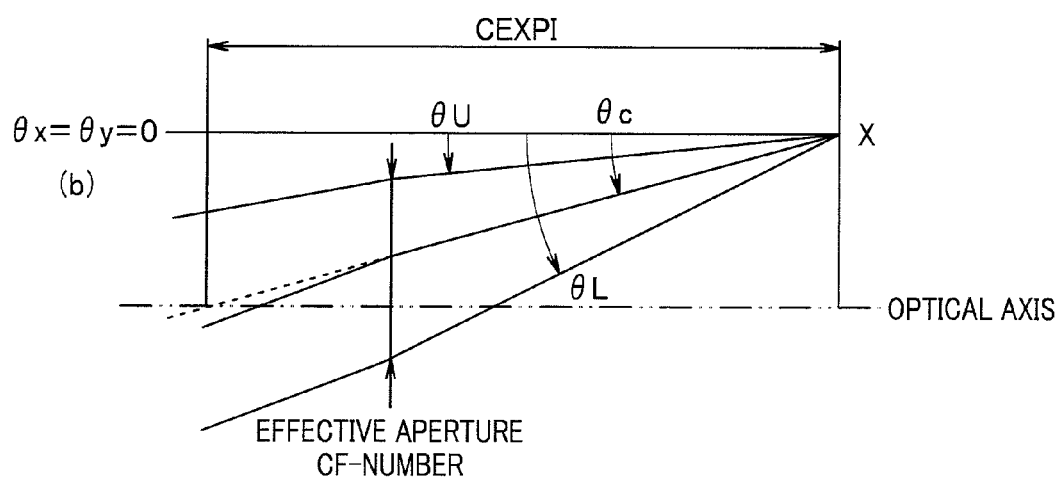

FIG. 7 an explanatory diagram for explaining an effective aperture (amended F-number) and an image forming luminous flux incident angle θc indicative of the central direction of the image forming luminous flux, with respect to an incident luminous flux incident on the AF pixel at an image height X. FIG. 7(a) shows an angular range of a pupil when viewed at image height X. The image forming luminous flux in a direction of the image height X exists in a range of incident angles θL to θU, and a center thereof is the image forming luminous flux incident angle θc.

Further, a ray incident angle on the light receiving surface corresponds to an intersection point of a ray passing the center of the image forming luminous flux (indicated by the broken line in FIG. 7(b)) and the optical axis in one-to-one relation. A rate of change of the above position is relatively small with respect to a rate of change of the image forming luminous flux incident angle θc. Therefore, high precision control can be performed using the relatively small number of bits by using the information of the above position in place of the information of the image forming luminous flux incident angle θc. In the present embodiment, hereinafter, the above position, i.e. the position of intersection between a straight line passing the center of the image forming luminous flux and the optical axis is referred to as "corrected exit pupil position (CEXPI)". It is noted that this may be different from an exit pupil position which is generally defined as a paraxial amount.

It is noted that the corrected exit pupil position (CEXPI) can be expressed by the following equations (1) and the corrected F-number can be expressed by the following equation (2).

$$\tan \theta c = (\tan \theta U + \tan \theta L)/2$$

$$CEXPI = x/\tan \theta c \quad (1)$$

$$CF\text{-number} = \tan \theta L - \tan \theta U \quad (2)$$

As described above, in the present embodiment, the information of the corrected F-number (CF-number) that is corrected in accordance with the image height and the corrected exit pupil position (CEXPI) that is corrected in accordance with the image height is used as the AF operation parameters. Since these pieces of information have different values for each optical system, information from the optical system is used. Further, since the corrected exit pupil position (CEXPI) may be infinity in dependence on a value of the image forming luminous flux incident angle θc, a value of reciprocal of the corrected exit pupil position (CEXPI) may be used as the AF operation parameter.

In the present embodiment, the information of the corrected F-number that is corrected in accordance with the image height and the corrected exit pupil position (CEXPI) that is corrected in accordance with the image height is used as the AF operation parameters on a lens side of a camera, and the sensitivity characteristics of the AF pixels are used as the AF operation parameters on a body side of the camera. The AF operation parameters on the lens side are values inherent to the lens side based on an optical design, and the AF operation parameters on the body side are values inherent to the body side based on a design of the image pickup device. Therefore, the AF operation parameters on the lens side and on the body side can be used in a case where a type on the lens side and a type of the body side are changed, by respectively retaining the AF operation parameters on the lens side and on the body side, and the AF arithmetic operation of high precision is made possible irrespective of the image height.

Figure 8:
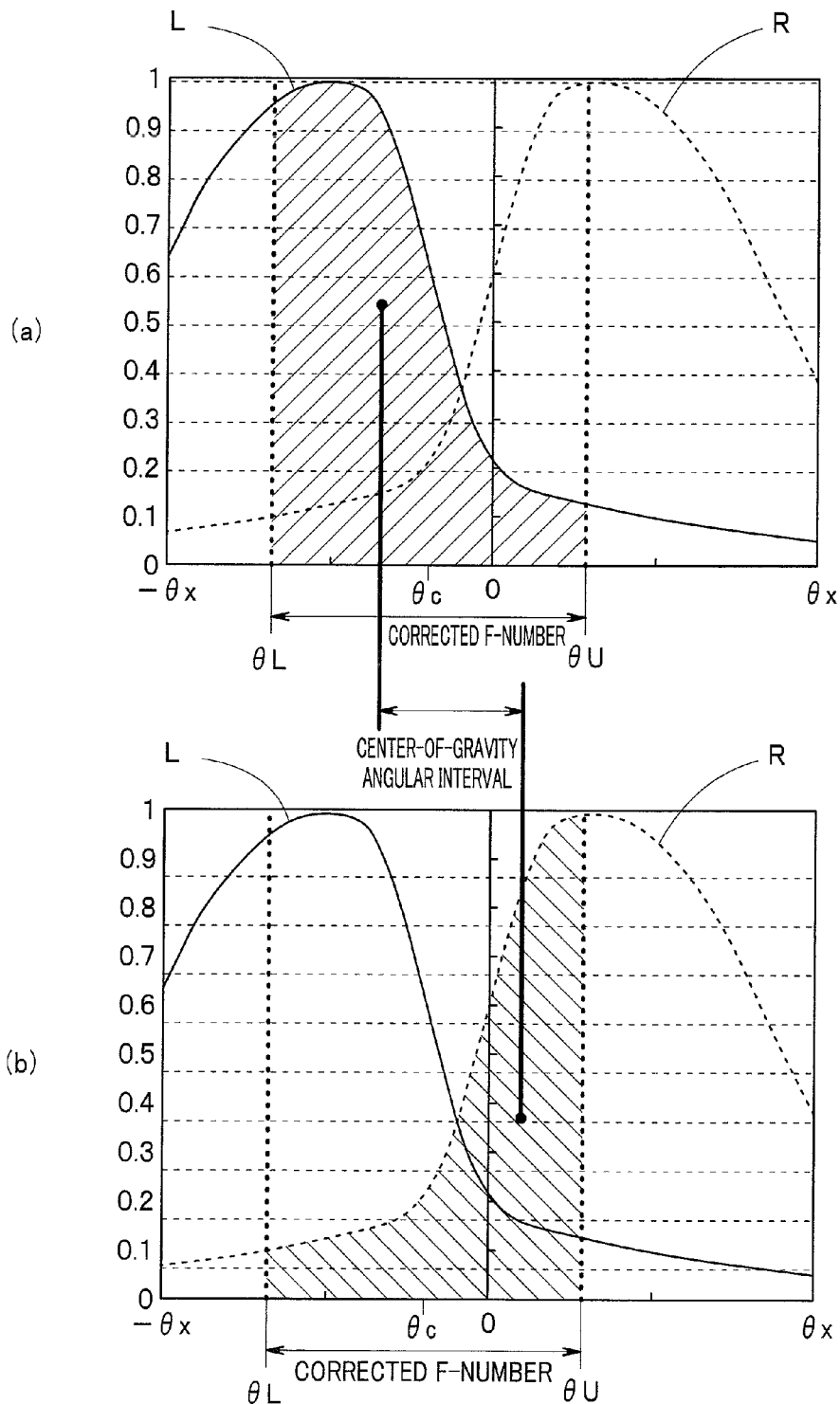
FIG. 8 is an explanatory diagram for explaining relation among sensitivity of the off-axis AF pixels at image height X, an incident angular range of an image forming luminous flux and AF sensitivity.

FIG. 8 is an explanatory diagram for explaining relation between the AF sensitivity and sensitivity of the off-axis AF pixels at image height X and an incident angular range of the image forming luminous flux. The solid line L shows light receiving sensitivity of the L pixel and the broken line R shows light receiving sensitivity of the R pixel. It is assumed that the image forming luminous flux is incident on the AF pixel indicative of the light receiving sensitivity characteristic in the angular range indicated by the solid broken line. That is, FIG. 8 shows that the image forming luminous flux is incident in an angular range corresponding to the corrected F-number, with the image forming luminous flux incident angle θc as a center.

A light receiving amount of the L pixel can be shown by the shaded area in FIG. 8(a). A light receiving amount of the R pixel can be shown by the shaded area in FIG. 8(b). It can be considered that a position of a center of gravity of the shaded region in FIG. 8(a) corresponds to an incident direction of the left luminous flux, and a position of a center of gravity of the shaded region in FIG. 8(b) corresponds to an incident direction of the right luminous flux. Then, it can be considered that an angular interval between the positions of the centers of gravity (center-of-gravity angular interval) is proportional to the AF sensitivity.

That is, the center-of-gravity angular interval can be expressed by the following expression (3) and the AF sensitivity can be expressed by the following equation (4).

$$\frac{\int_{\theta L}^{\theta U} f(\theta x) \times \theta x \times 2 \times \theta y}{\int_{\theta L}^{\theta U} f(\theta x) \times 2 \times \theta y} \quad (3)$$

$$\mathrm{Tan}^{-1}(0.5/CF\text{-number}) = \sqrt{(\theta x - \theta c)^2 + (\theta y)^2} \quad (4)$$

It is noted that FIG. 8 shows the light receiving sensitivity of the AF pixels at the predetermined image height, and the light receiving sensitivity of the AF pixels varies in accordance with the image height. Therefore, in the body side, it is preferable to retain the information of the light receiving sensitivity of the AF pixels at each image height and utilize the information.

Further, areas of the shaded regions in FIGS. 8(a) and 8(b) correspond to the light receiving amounts of the L and R pixels. If there is a difference between the light receiving amount of the L pixel and the light receiving amount of the R pixel with respect to the same object, the L image based on the L pixel and the R image based on the R pixel differ from each other to make detection of the two-image interval difficult. Therefore, it is configured that L and R image signals are subjected to an illuminance amendment in accordance with the areas of the shaded regions in FIGS. 8(a) and 8(b), to make the detection of the two-image interval easy. It is noted that an area ratio between an area SL of the shaded portion in FIG. 8(a) and an area SR of the shaded portion in FIG. 8(b) can be expressed by the following expression (5), and the illuminance amendment can be expressed by the following equation (6).

$$\int_{\theta L}^{\theta U} f(\theta x) \times 2 \times \theta y \quad (5)$$

$$\mathrm{Tan}^{-1}(0.5/CF\text{-number}) = \sqrt{(\theta x - \theta c)^2 + (\theta y)^2} \quad (6)$$

(Circuit Configuration)

As shown in FIG. 1, a photographing apparatus 1 in the present embodiment is constituted by a body portion 20 in which principal circuits are provided and a lens portion 10 which is mounted to a casing of the body portion 20. Besides, the lens portion 10 may be an interchangeable lens which is detachably mounted to the body portion 20. An optical system 11 is provided at the lens portion 10 and the optical system 11 is configured to conduct an optical image of an object on an image pickup surface of an image pickup device 21 in the body portion 20. The optical system 11 has a lens not shown and has an autofocus function to perform focusing by being driven by a control section 13. Further, the optical system 11 may have a zoom function by being driven by the control section 13. It is noted that as the lens portion 10, one having a photographing lens with a single focus may be adopted.

The lens portion 10 is provided with a memory 12. The memory 12 is configured to store various types of information, e.g. information about a diaphragm position, a diaphragm diameter, an exit pupil position, an exit pupil diameter, a focus lens position, vignetting in accordance with image height and direction, etc.

Further, in the present embodiment, the memory 12 retains information of the corrected F-numbers (CF-numbers) and the reciprocal numbers of the corrected exit pupil positions (CEXPI), which are corrected in accordance with image heights, as the AF operation parameters. It is configured that the information of the AF sensitivity can be obtained in the body portion 20 by transmitting the AF operation parameters in the memory 12 to the body portion 20.

FIG. 9 is an explanatory diagram for explaining the information retained in the memory 12. As shown in FIG. 9, the information of the corrected F-numbers (CF-numbers) and the reciprocal numbers of the corrected exit pupil positions (1/CEXPI) for respective image heights X are stored in the memory 12 in accordance with each lens state. It is noted that, in FIG. 9, only three image heights are shown for the sake of simplification of drawing, but actually, information for a number of image heights is stored taking account of a conceived AF pixel arrangement. Further, the lens state corresponds to a focus state, a zoom state, a diaphragm state, etc. and the information regarding a number of states is stored.

The body portion 20 includes the image pickup device 21 constituted by an image pickup device such as a CMOS sensor. The image pickup device 21 has a light receiving surface for receiving light of an object from the lens portion 10. It is configured that an optical image of the object from the lens portion 10 is formed on the light receiving surface.

In the present embodiment, the above-mentioned normal pixels (N), the L pixels and the R pixels are formed on the image pickup device 21.

The image pickup device 21 performs photoelectric conversion of the optical image of the object and outputs a result of the photoelectric conversion to a signal extracting section 22. The signal extracting section 22 extracts an image signal from the output from the image pickup device 21 and outputs the image signal. It is noted that the image signal includes an L image signal based on outputs of the L pixels and an R image signal based on outputs of the R pixels as well as an image signal based on outputs of the normal pixels (N). The signal extracting section 22 outputs the captured image signal to an image processing section 23, and also outputs the L image signal and the R image signal based on the outputs of the AF pixels to an illuminance correction section 28.

The image processing section 23 performs predetermined signal processing, e. g. various types of signal processing of color signal generation processing, matrix conversion processing and so forth. The image processing section 23 is capable of providing the processed image signal to a display section 24 to thereby display a picked-up image. Further, the image processing section 23 is capable of providing image information compressed by performing encoding processing on the processed image signal to a recording section 25 to thereby record the information.

As the recording section 25, a card interface can be adopted, for example, and the recording section 25 is capable of recording image information, audio information, etc. in a memory card or the like. Further, the recording section 25 can read image information and audio information recorded in a recording medium and supply the read information to the image processing section 23. It is configured that the image processing section 23 can decode the image information and the audio information from the recording section 25 to obtain the image signal and the audio signal.

To the display section 24, the picked-up image from the image pickup device 21 and a reproduction image from the recording section 25 are supplied and the display section 24 can display these images. Further, it is configured that the display section 24 can perform a menu display for operating the photographing apparatus 1 under control of a control section 31.

The control section 31 is configured to control respective parts of the body portion 20. For example, the control section 31 is configured to detect a user's operation of various types of switches, e.g. a switch for photographing mode setting and a release button for performing photographing, etc. provided on a casing of the body portion 20, and control the respective parts based on the user's operation.

In the present embodiment, a body memory 27 is provided. The body memory 27 retains the information about the sensitivity characteristics of the respective AF pixels in accordance with the image height as the AF operation parameters. An image height correction section 26 reads the AF operation parameters retained in the memory 12 and the AF operation parameters retained in the body memory 27, and generates information of the AF sensitivity in accordance with the image height and information for correcting the illuminance in accordance with the image height.

That is, the image height correction section 26 obtains the shaded regions of the L pixel and the R pixel in FIG. 8 based on the information of the sensitivity of the AF pixels, the corrected exit pupil position (CEXPI) and the corrected F-number (CF-number), calculates the AF sensitivity based on a difference between the centers of gravity, and outputs the calculation result to a lens control amount calculation section 30. Further, the image height correction section 26 obtains an illuminance correction control value based on a ratio of the areas of the shaded regions of the L pixel and the R pixel in FIG. 8 and outputs the obtained value to the illuminance correction section 28.

The illuminance correction section 28 corrects the L image signal and the R image signal from the signal extracting section 22 based on the illuminance correction control value and outputs the corrected value to a two-image interval operation section 29. The two-image interval operation section 29 obtains the two-image interval from the L image signal and the R image signal which have been subjected to the illuminance correction and outputs the obtained value to the lens control amount calculation section 30.

The lens control amount calculation section 30 calculates the defocus amount using the information of the two-image interval from the two-image interval operation section 29 and the AF sensitivity from the image height correction section Since the information of the AF sensitivity is corrected in accordance with the image height, the lens control amount calculation section 30 can calculate the defocus amount with high precision even in a case where the two-image interval is obtained using the off-axis AF pixels.

The lens control amount calculation section 30 outputs the obtained defocus amount to the control section 13 of the lens portion 10. The control section 13 is configured to control the optical system based on the given defocus amount to thereby perform a focusing action.

Figure 10:
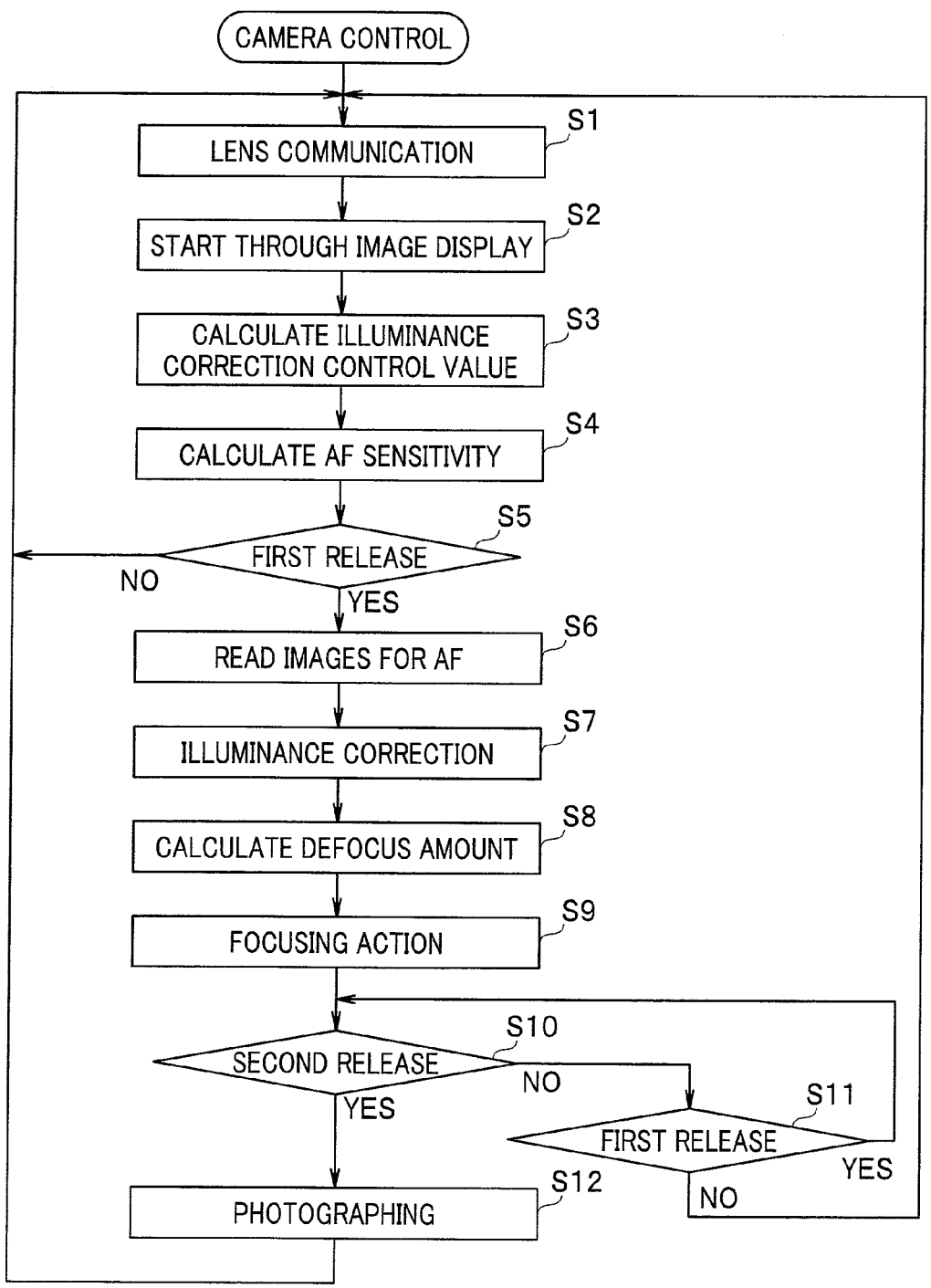
FIG. 10 is a flowchart for explaining camera control in the first embodiment.

Next, an operation of the embodiment having the above configuration will be described referring to FIG. 10. FIG. 10 is a flowchart for explaining camera control in the present embodiment.

When a power supply to the photographing apparatus is 1 turned on, the control section 31 performs lens communication in Step S1 of FIG. 10. The image height correction section 26 of the body portion 20 reads the AF operation parameters from the memory 12 of the lens portion 10. The control section 31 causes the display section 24 to live-view display the picked-up image (through image) based on the image signal from the image pickup device 21 in Step S2. The control section 31 causes calculation of the illuminance correction control value in next Step S3 and causes calculation of the AF sensitivity in Step S4.

The image height correction section 26 reads the information about the sensitivity of the AF pixels at each image height from the body memory 27, and obtains the illuminance correction control value, for example, according to the above equations (5) and (6) using the information of the corrected exit pupil position (CEXPI) and the corrected F-number (CF-number) read from the memory 12.

Further, the image height correction section 26 obtains the AF sensitivity, for example, according to the above expression (3) and equation (4) using the information about the sensitivity of the AF pixels, the information of the corrected exit pupil position (CEXPI) and the corrected F-number (CF-number) at each image height.

The control section 31 determines whether or not a first release operation of half depressing a release button is performed in next Step S5. The processing of Steps S1-S4 is repeated until the first release is performed. When the first release is performed, the control section 31 instructs to read the AF pixels (Step S6).

The illuminance correction section 28 reads the L image signal and the R image signal from the signal extracting section 22, and performs the illuminance correction using the illuminance correction control value calculated in the image height correction section 26 (Step S7). The L image signal and the R image signal which have been subjected to the illuminance correction are supplied to the two-image interval operation section 29 in which the two-image interval is calculated. The information of the two-image interval is supplied to the lens control amount calculation section 30, and the lens control amount calculation section 30 calculates the defocus amount based on the two-image interval and the AF sensitivity in Step S8.

The information of the AF sensitivity which the lens control amount calculation section 30 uses for the AF operation is calculated by the image height correction section 26 for each image height, and the defocus amount of high precision is obtained irrespective of the image height. The lens control amount calculation section 30 transmits the obtained defocus amount to the control section 13 of the lens portion 10 (Step S9) Using the defocus amount, the control section 13 performs the focusing action by driving the optical system 11.

The control section 31 determines in Step S10 whether or not a second release operation of fully depressing the release button is performed. The control section 31 detects the first release operation in Step S11. That is, the procedure enters a waiting state in which whether or not the second release operation is performed after the first release is detected, by the determinations of Steps S10 and S11. When a photographer discontinues the half depression of the release button, the procedure returns from Step S11 to Step S1, and the processing of Step S1 and subsequent Steps is repeated.

When control section 31 determines that the second release operation is performed after the first release at Step S10, the control section 31 causes the procedure to proceed to Step S12 to perform photographing. At the time of the photographing, the focusing action using the AF sensitivity corrected in accordance with the image height has been performed so that the object can be photographed in a state of being securely focused.

As described above, in the present embodiment, the defocus amount is obtained by calculating the AF sensitivity based on the corrected F-number (CF-number) that is corrected in accordance with the image height, the corrected exit pupil position (CEXPI) that is corrected in accordance with the image height and the sensitivity of the AF pixels at each image height, so that the focus control of high precision is possible irrespective of the image height of the AF pixels. Further, the information of the corrected F-number (CF-number) and the corrected exit pupil position (CEXPI), which are determined in accordance with the characteristics of the lens side, is stored in the lens side, and the sensitivity information of the AF pixels, which is determined in accordance with the characteristics of the body side, is stored in the body side, so that the AF operation of high precision is made possible irrespective of the image height even when the types of the lens side and the body side are respectively changed. Thus, focus processing of high precision is possible even in a case of using the AF pixels at any position on the light receiving surface.

Second Embodiment

Figures 11, 12:
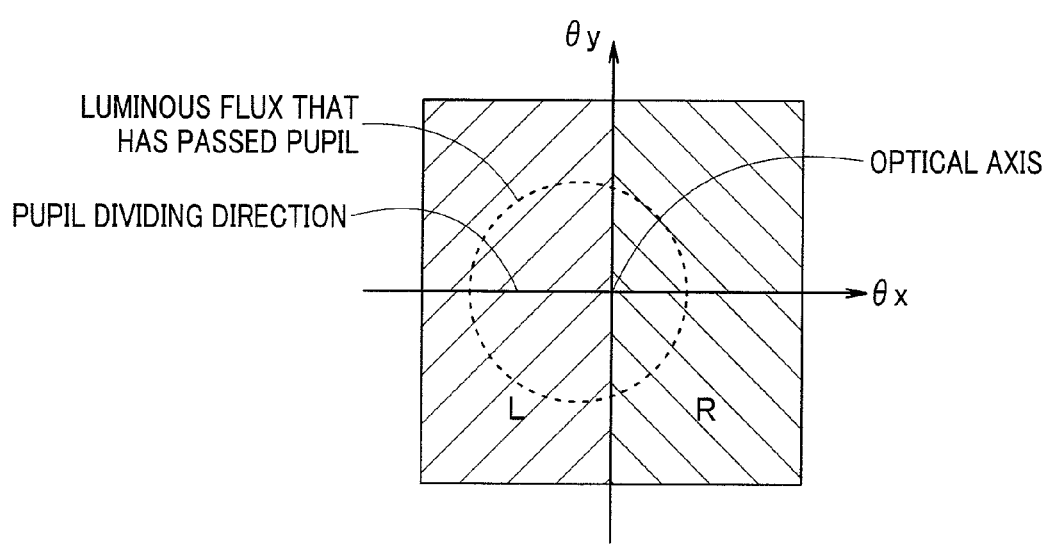
FIG. 11 is an explanatory diagram showing an AF sensitivity table adopted in a second embodiment of the present invention.
FIG. 12 is an explanatory diagram for explaining sensitivity distribution of the pixels and a direction with respect to an angular range of an image forming luminous flux.

FIG. 11 is an explanatory diagram showing an AF sensitivity table adopted in a second embodiment of the present invention. The hardware configuration of the present embodiment is the same as shown in FIG. 1. The present embodiment differs from the first embodiment only in that the AF sensitivity is obtained using the AF sensitivity table stored in the body memory 27, in the image height correction section 26.

In the first embodiment, the image height correction section 26 calculates the AF sensitivity based on the corrected F-number (CF-number) that is corrected in accordance with the image height, the corrected exit pupil position (CEXPI) that is corrected in accordance with the image height and the sensitivity of the AF pixels at each image height. In the present embodiment, the body memory 27 retains the calculation results as the AF sensitivity table. Therefore, it is sufficient that the image height correction section 26 reads the AF sensitivity stored in the AF sensitivity table based on the information of the corrected F-number (CF-number) and the corrected exit pupil position (CEXPI) (or the reciprocal thereof).

As shown in FIG. 11, in the AF sensitivity table, information of AF sensitivities $\alpha 1{-}15$ to $\alpha 22{+}3$ corresponding to the information of the corrected F-numbers (CF-numbers) and the reciprocals of the corrected exit pupil positions (CEXPI) is stored. It is noted that in FIG. 11, 1000/CEXPI shows a value obtained by multiplying a reciprocal of the corrected exit pupil position (CEXPI) by 1000.

As described, in the present embodiment, the table having information of the corrected F-number (CF-number) and the reciprocal of the corrected exit pupil position (CEXPI) for each lens state and for each image height is stored on the lens side, and the AF sensitivity table having information of the AF sensitivities corresponding to the information of the corrected F-numbers (CF-numbers) and the reciprocals of the corrected exit pupil positions (CEXPI) is stored on the body side, and thereby the calculation of the AF sensitivity and the defocus amount in accordance with the image height is possible with extremely simple configuration.

It is noted that in the above embodiments, the description of the sensitivity distribution of the AF pixels and the angular range of the image forming luminous flux is given only with respect to the pupil dividing direction which is $\theta x$ direction shown in FIG. 12 in order to simplifying the description. FIG. 12 shows this condition in which the luminous flux which has passed the pupil is displaced from the optical axis outside of the axis in the pupil dividing direction. However, in actuality, the image forming luminous flux displaces in $\theta y$ direction, and therefore the sensitivity distribution of the AF pixels and the angular range of the image forming luminous flux are considered two dimensionally. Further, the AF sensitivity may be obtained taking account of off-axis distortion of the image forming luminous flux.

Further, in the embodiments of the present invention, the description is given using a digital camera as an apparatus for photographing, but the camera may be a digital single-lens reflex camera and a compact digital camera, and may be a moving picture camera such as a video camera, a movie camera, and further may be a camera build in a personal digital assistant (PDA) such as a portable telephone and a smart phone. Furthermore, the camera may be a medical or industrial optical apparatus such as an endoscope and a microscope.

The present invention is not limited to the foregoing embodiments without change, and can be embodied by modifying the elements within a range not to be deviated from the gist of the invention in a stage of carrying out the invention. Further, various types of inventions may be formed by appropriate combinations of the plurality of elements disclosed in the foregoing embodiments. For example, some of the all elements shown in the embodiments may be omitted. Furthermore, elements in the different embodiments may be appropriately combined.

Besides, even if the description is given by using "first", "next", etc. in the claims, the specification and the operation flow in the drawings, it does not mean that execution in this order is essential. Further, it is needless to say that the respective steps constituting the operation flow can be appropriately omitted with respect to a portion which does not affect the essence of the invention.

What is claimed is:

1. A photographing apparatus having a body portion to which a lens portion is mountable and to which an image forming luminous flux is conducted from the lens portion, the photographing apparatus comprising:
    an image pickup device having pixels for image pickup and at least two types of pixels for focus detection for use in a pupil dividing phase difference method;
    a storage section that retains information of sensitivity characteristics indicative of light receiving sensitivity corresponding to ray incident angles on the two types of pixels for focus detection at a predetermined image height; and
    an image height correction section that obtains information about incident angular ranges of the image forming luminous fluxes respectively incident on the two types of pixels for focus detection, from the lens portion, reads the information stored in the storage section, obtains centers of gravity of distributions of the light receiving sensitivity when the angular ranges based on the information about the angular ranges of the image forming luminous fluxes are set as the ray incident angles on the two types of pixels for focus detection, and acquires information for focus control by a distance between the obtained centers of gravity.

2. The photographing apparatus according to claim 1, wherein the storage section stores the information of the sensitivity characteristics for each image height.

3. The photographing apparatus according to claim 1, wherein the information about the incident angular range includes information of a corrected F-number obtained by correcting an F-number in accordance with an image height and information of a corrected exit pupil position obtained by correcting an exit pupil position in accordance with the image height.

4. The photographing apparatus according to claim 1, wherein the image height correction section calculates AF sensitivity for converting phase difference detection information which is obtained based on outputs of the two types of pixels for focus detection into a defocus amount of the lens portion.

5. The photographing apparatus according to claim 1, further comprising:
    an illuminance correction section that calculates a correction value for correcting influence on outputs of the pixels for focus detection by illuminance distribution.

6. The photographing apparatus according to claim 1, wherein the lens portion has a lens storage section that stores information about the incident angular range for each lens state of the lens portion.

7. The photographing apparatus according to claim 6, wherein the lens portion has a focus lens, a zoom lens and a diaphragm, and the lens state includes information about at least one of a focus state, a zoom state, a diaphragm state of the lens portion.

8. The photographing apparatus according to claim 4, wherein the image height correction section calculates the AF sensitivity in accordance with an image height.

9. The photographing apparatus according to claim 4, wherein the pixels for focus detection includes a pair of pixels that receive a pair of luminous fluxes subjected to pupil division, and
    the image height correction section calculates the AF sensitivity by obtaining ranges of the luminous fluxes respectively incident on the pair of pixels and calculating an interval of centers of gravity of the luminous fluxes.

10. The photographing apparatus according to claim 5, wherein the illuminance correction section calculates the correction value in accordance with an image height.

11. A photographing apparatus having a lens portion for conducting image forming luminous flux and a body portion to which the lens portion is mountable, the photographing apparatus comprising:
    an image pickup device having pixels for image pickup and at least two types of pixels for focus detection for use in a pupil dividing phase difference method, the image forming luminous flux from the lens portion being incident on the image pickup device;
    a memory including
        a first portion that retains information about incident angular ranges of image forming luminous fluxes that are incident on the two types of pixels for focus detection, and
        a second portion that stores information for focus control, which is obtained based on information of sensitivity characteristics indicative of light receiving sensitivity corresponding to ray incident angles on the two types of pixels for focus detection at a predetermined image height and information about the incident angular ranges, to be associated with the information about the incident angular ranges; and
    an image height correction section that reads the information for focus control from the second portion based on the information read from the first portion and outputs focus control information,
    wherein a distance between centers of gravity of distributions of the light receiving sensitivity is stored in the second portion as the information for focus control when the angular ranges based on the information about the angular ranges of the image forming luminous fluxes are set as the ray incident angles on the two types of pixels for focus detection.

12. The photographing apparatus according to claim 11, wherein the first portion stores the information about the incident angular ranges for each lens state of the lens portion.

13. The photographing apparatus according to claim 11, wherein the first portion stores information of a corrected F-number obtained by correcting an F-number in accordance with an image height and information of a corrected exit pupil position obtained by correcting an exit pupil position in accordance with the image height as the information about the incident angular ranges.

14. The photographing apparatus according to claim 12, wherein the lens portion has a focus lens, a zoom lens and a diaphragm, and the lens state includes information about at least one of a focus state, a zoom state, a diaphragm state of the lens portion.

15. The photographing apparatus according to claim 11, wherein the information for focus control is AF sensitivity for converting phase difference detection information which is obtained based on outputs of the two types of pixels for focus detection into a defocus amount of the lens portion.

16. The photographing apparatus according to claim 11, further comprising:
an illuminance correction section that calculates a correction value for correcting influence on an output of the pixels for focus detection by illuminance distribution.

17. A method of calculating information for focus control in a photographing apparatus that includes a body portion and a lens portion mountable on the body portion, the body portion having an image pickup device including a plurality of pairs of pixels for focus detection that respectively receive a pair of luminous fluxes obtained by subjecting a photographing luminous flux to pupil division, the method comprising:
reading information about incident angular ranges of the pair of image forming luminous fluxes respectively incident on the pair of pixels for focus detection, from the lens portion;
reading information of sensitivity characteristics indicative of light receiving sensitivity corresponding to ray incident angles on the pair of pixels for focus detection at a predetermined image height, from the body portion;
calculating an interval of centers of gravity of luminous fluxes respectively incident on the pair of pixels for focus detection based on the information about the incident angular ranges and the information of the sensitivity characteristics; and
calculating the information for focus control from the interval of the centers of gravity.

18. The method of calculating information for focus control according to claim 17, wherein the information about the incident angular range includes information of a corrected F-number obtained by correcting an F-number in accordance with an image height and information of a corrected exit pupil position obtained by correcting an exit pupil position in accordance with the image height.

19. The method of calculating information for focus control according to claim 17, wherein the centers of gravity of luminous fluxes are obtained by obtaining ranges of the luminous fluxes respectively incident on the pair of pixels for focus detection based on the information about the incident angular ranges, and by obtaining light receiving amounts of the luminous fluxes based on the ranges of the luminous fluxes and the sensitivity characteristics of the pixels for focus detection.

20. The method of calculating information for focus control according to claim 19, wherein ranges of the luminous fluxes respectively incident on the pair of pixels for focus detection are obtained based on the information about the incident angular ranges in accordance with image heights of the pair of pixels for focus detection, and the light receiving amounts of the luminous fluxes are obtained based on the sensitivity characteristics of the pair of pixels for focus detection in accordance with the image heights of the pair of pixels for focus detection.

21. A camera system having a lens portion for conducting image forming luminous flux and a body portion to which the lens portion is mountable, the camera system comprising:
an image pickup device having pixels for image pickup and at least two types of pixels for focus detection for use in a pupil dividing phase difference method;
a first storage section that is provided at the lens portion and retains information about incident angular ranges of the image forming luminous fluxes that are incident on the two types of pixels for focus detection;
a second storage section that is provided at the body portion and retains information of sensitivity characteristics indicative of light receiving sensitivity corresponding to ray incident angles on the two types of pixels for focus detection at a predetermined image height; and
an image height correction section that obtains, based on information read from the first and second storage sections, centers of gravity of distributions of the light receiving sensitivity when the angular ranges based on the information about the angular ranges of the image forming luminous fluxes are set as the ray incident angles on the two types of pixels for focus detection, and acquires information for focus control by a distance between the obtained centers of gravity.

22. The camera system according to claim 21, wherein the first storage section stores the information about the incident angular ranges for each lens state of the lens portion.

23. The camera system according to claim 21, wherein the first storage section stores information of a corrected F-number obtained by correcting an F-number in accordance with an image height and information of a corrected exit pupil position obtained by correcting an exit pupil position in accordance with the image height as the information about the incident angular ranges.

24. The camera system according to claim 22, wherein the lens portion has a focus lens, a zoom lens and a diaphragm, and the lens state includes information about at least one of a focus state, a zoom state, a diaphragm state of the lens portion.

25. The camera system according to claim 21, wherein the second storage section stores the information of the sensitivity characteristics for each image height.

26. The camera system according to claim 21, wherein the image height correction section calculates AF sensitivity for converting phase difference detection information which is obtained based on outputs of the two types of pixels for focus detection into a defocus amount of the lens portion.

27. The camera system according to claim 26, wherein the image height correction section calculates the AF sensitivity in accordance with an image height.

28. The camera system according to claim 26, wherein the pixels for focus detection includes a pair of pixels that receive a pair of luminous fluxes subjected to pupil division, and
the image height correction section calculates the AF sensitivity by obtaining ranges of the luminous fluxes respectively incident on the pair of pixels and calculating an interval of centers of gravity of the luminous fluxes.

29. The camera system according to claim 21, further comprising:
an illuminance correction section that calculates a correction value for correcting influence on outputs of the pixels for focus detection by illuminance distribution.

30. The camera system according to claim 29, wherein the illuminance correction section calculates the correction value in accordance with an image height.

* * * * *